UNITED STATES PATENT OFFICE.

ROBERT GANS, OF PANKOW, NEAR BERLIN, GERMANY, ASSIGNOR TO J. D. RIEDEL AKTIENGESELLSCHAFT, OF BERLIN, GERMANY, A CORPORATION OF GERMANY.

PROCESS FOR REMOVING IRON AND ORGANIC GERMS FROM WATER.

951,641.     Specification of Letters Patent.     Patented Mar. 8, 1910.

No Drawing.     Application filed August 19, 1909. Serial No. 513,635.

*To all whom it may concern:*

Be it known that I, ROBERT GANS, a subject of the German Emperor, residing at Pankow, near Berlin, Germany, have invented a certain new and useful Process for Removing Iron and Organic Germs from Water, of which the following is a specification.

It has already been proposed to treat water with manganic oxid (also called black oxid $MnO_2$) for removing the iron by oxidation. According to the present process the water to be relieved of iron is treated with insoluble higher oxids of manganese with the aid of natural or artificial zeolites. If, for instance, calcium-zeolites are first treated with a solution of a salt of manganous oxid, an exchange of calcium for manganese takes place, thereby forming manganese zeolites, which on treatment with permanganates act according to the following equation, while higher oxids of manganese are separated out.

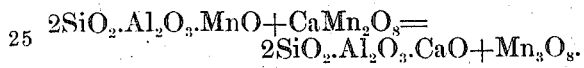
$$2SiO_2.Al_2O_3.MnO + CaMn_2O_8 = 2SiO_2.Al_2O_3.CaO + Mn_3O_8.$$

In this manner a higher stage of oxidation than that of manganic oxid is therefore produced. This higher oxid of manganese in a fine state of division is intimately distributed throughout the zeolite, which is easily permeable for water and to which it adheres firmly. It yields up its oxygen much more easily than the manganic oxid. For this reason the removal of the iron from water by oxidation of the same, by the finely distributed oxids of manganese takes place even, when the water is filtered through the zeolite mass at a speed of filtration of 30 meter and upward, while with the use of manganic oxid the same effect can only be produced with a much lower speed of filtration.

The lower oxids of manganese, obtained by the present process (of purifying water from iron) from the oxids of manganese finely distributed in the zeolites, by the oxidation and precipitation of ferrous oxid compounds dissolved in the water, may be easily reconverted into the higher oxids of manganese, by treating the zeolites with materials which readily yield up oxygen, such as permanganates, manganates, persulfates and ozone, after which the zeolite mass containing the latter in a fine state of distribution may be again used for the removal of iron from water.

Together with the iron any manganese, which may be present in the water in the form of a solution, is removed from the water by the present process.

If water containing organic germs is filtered through the zeolites obtained by the action of permanganate solutions on manganese zeolites and containing higher oxids of manganese finely distributed, the organic matter and the germs of the water are destroyed during the filtration, owing to the property of easily yielding oxygen possessed by the higher oxids of manganese. Consequently the present process is applicable also for the preparation of drinking water free from germs. For this purpose the process may be modified by directly adding to the water an excess of permanganate solution and then filtering it through zeolites containing low oxids of manganese. The low oxids reduce the excess of permanganate and take up the manganese as well as the remaining bases of the permanganate, so that a drinking water is obtained, which no longer contains any permanganate.

What I claim is:—

The process for the removal of iron and organic germs from water, which consists in treating the water with insoluble higher oxids of manganese with the aid of zeolites, substantially as described.

In testimony whereof I have hereunto set my hand in the presence of two subscribing witnesses.

ROBERT GANS.

Witnesses:
PAUL LIEDLER,
CORNELIUS MASSAIM.